United States Patent
Schwarz et al.

(10) Patent No.: US 9,203,691 B2
(45) Date of Patent: Dec. 1, 2015

(54) FAIL-SAFE COMMUNICATION SYSTEMS AND METHODS

(75) Inventors: Baruch Schwarz, Raanana (IL); Ariel Picholtz, Even Yehuda (IL); Yigal Leiba, Holon (IL)

(73) Assignee: Siklu Communication Ltd., Petach-Tikva (IL)

( * ) Notice: Subject to any disclaimer, the term of this patent is extended or adjusted under 35 U.S.C. 154(b) by 670 days.

(21) Appl. No.: 13/527,927

(22) Filed: Jun. 20, 2012

(65) Prior Publication Data

US 2012/0257495 A1   Oct. 11, 2012

Related U.S. Application Data

(63) Continuation-in-part of application No. 12/873,105, filed on Aug. 31, 2010, now Pat. No. 8,674,885.

(51) Int. Cl.
*H04W 24/00* (2009.01)
*H04L 12/24* (2006.01)
*H01Q 1/24* (2006.01)
*H01Q 21/28* (2006.01)

(52) U.S. Cl.
CPC ............ *H04L 41/0668* (2013.01); *H01Q 1/246* (2013.01); *H01Q 21/28* (2013.01)

(58) Field of Classification Search
CPC ..... H01Q 1/246; H01Q 21/28; H04L 41/0654
USPC .......... 343/853, 840, 703, 894; 455/423, 424; 370/228

See application file for complete search history.

(56) References Cited

U.S. PATENT DOCUMENTS

| | | | |
|---|---|---|---|
| 1,876,694 A * | 9/1932 | Kruesi | 455/25 |
| 1,918,291 A * | 7/1933 | Schroter | 455/25 |
| 2,140,730 A * | 12/1938 | Batchelor | 455/25 |
| 3,614,401 A | 10/1971 | Lode | |
| 4,819,225 A | 4/1989 | Hochstein | |
| 6,081,511 A | 6/2000 | Carr et al. | |
| 6,282,669 B1 | 8/2001 | Imanaka et al. | |
| 6,337,860 B1 | 1/2002 | Wicklund | |
| 6,359,858 B1 | 3/2002 | Smith et al. | |
| 7,248,560 B1 | 7/2007 | Blankenship et al. | |
| 7,675,851 B2 | 3/2010 | Koren et al. | |

* cited by examiner

*Primary Examiner* — Michael C Wimer
(74) *Attorney, Agent, or Firm* — Active Knowledge Ltd.

(57) ABSTRACT

Various embodiments of a fail-safe communication system in which certain communication components fail, the system detects the failure, and the system maintains communication by routing data sets to different communication components. In various embodiments, the communication components fail on the network side. In various embodiments, the communication components fail on the remote side. In various embodiments, there are methods for fail-safe communication in which a system detects communication component failure, and routes data sets to other communication components.

21 Claims, 6 Drawing Sheets

180
FAIL-SAFE COMMUNICATION SYSTEMS AND METHODS

CROSS-REFERENCE TO RELATED APPLICATIONS

This Application is a Continuation-In-Part of U.S. application Ser. No. 12/873,105, filed Aug. 31, 2010, now U.S. Pat. No. 8,674,885.

BACKGROUND

Communication systems typically include both a network front end transceiver, and a backhaul link connecting the network front end transceiver with a core network. Such systems have points of vulnerability. One point of vulnerability is the network front end transceiver, which may fail due to power problems, mechanical damage, or any number of other reasons. If the communication system does not have a backup system, or "fail-safe" position, the failure of the network front end transceiver may cause a complete breakdown of communication. The same kind of vulnerability may appear at a remote site communicatively connected with the network front end transceiver. At the remote site, end users, often called "subscriber stations", are in communication with a base station, which is in communication with the network front end transceiver via a remote transceiver located at the remote site. If this remote transceiver were to fail for any reason, and if there were no backup system, the failure of the remote transceiver at the remote site may cause a complete breakdown of communication.

SUMMARY

Described herein are fail-safe communication systems with a single backhaul cable connecting multiple front end transceivers to either a core network or a remote site. Also described herein are fail-safe communication methods.

One embodiment is a fail-safe network communication system operative to communicatively connect a core network with a remote site. In one particular form of such an embodiment, the system includes a single backhaul cable, a first point-to-point communication system, and a second point-to-point communication system. In this particular form of the embodiment, the backhaul cable directly connects the first point-to-point communication systems with the core network. Also in this particular form of the embodiment, the first point-to-point communication system includes a wireline communication interface operative to (i) communicatively connect the backhaul cable with point-to-point communication components of the first point-to-point communication system, and (ii) communicatively connect the backhaul cable, using a bypass cable, with point-to-point communication components of the second point-to-point communication system, in an event of malfunction associated with the first point-to-point communication system, such that the second point-to-point communication system performs point-to-point and backhaul communication instead of the first point-to-point communication system.

One embodiment is a method for fail-safe communication. In one particular form of such embodiment, a first point-to-point communication system relays one or more sets of data (i) from a core network to a wireline communication interface belonging to the first point-to-point communication system via a backhaul cable, (ii) from the wireline communication interface to point-to-point communication components of the first point-to-point communication system, and (iii) from the point-to-point communication components of the first point-to-point communication system to a remote site. The wireline communication interface detects a failure in the point-to-point communication components of the first point-to-point communication system or in a first power supplier located in the first point-to-point communication system. The failure, whether in the point-to-point communication components or in the first power supplier, prevents the first point-to-point communication system from relaying said sets of data between the core network and the remote site. The wireline communication interface bypasses the point-to-point communication components of the first point-to-point communication system by routing the sets of data from the wireline communication interface to point-to-point communication components of a second point-to-point communications system via a bypass cable, thereby allowing delivery of the sets of data to the remote site via the second point-to-point communication system.

One embodiment is a fail-safe communication system operative to communicatively connect a remote site with a core network. Such system has a single feed cable. In one particular form of such embodiment, the system includes a first point-to-point communication system, a second point-to-point communication system, and a feed cable that directly connects the first point-to-point communication systems with a remote site. In a particular form of the embodiment, the first point-to-point communication system includes a wireline communication interface operative to: (i) communicatively connect the feed cable with point-to-point communication components of the first point-to-point communication system, and (ii) communicatively connect the feed cable, using a bypass cable, with point-to-point communication components of the second point-to-point communication system, in an event of malfunction associated with the first point-to-point communication system, such that the second point-to-point communication system performs point-to-point and data relaying instead of the first point-to-point communication system.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1:
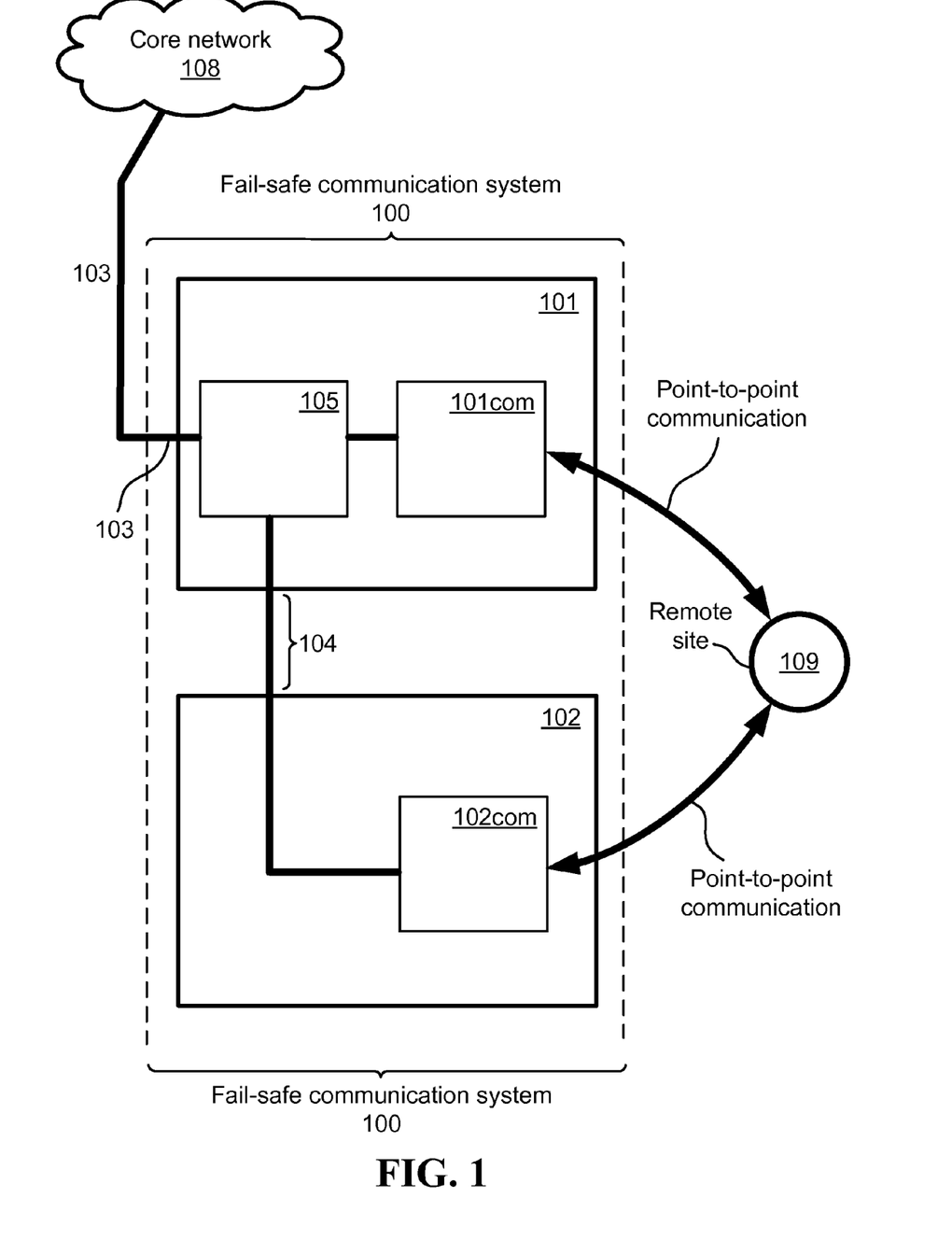
FIG. 1 illustrates one embodiment of a fail-safe communication system.

FIGS. 1 through 4, inclusive, illustrate various embodiments of a fail-safe communication system. FIG. 1 illustrates one embodiment of a fail-safe communication system 100. In FIG. 1, the fail-safe communication system 100 is communicatively connected by a single backhaul cable 103 to a core network 108. The fail-safe communication system 100 is also in point-to-point communication with a remote site 109. The fail-safe communication system 100 includes a first point-to-point communication system 101 and a second point-to-point communication system 102. The first point-to-point communication system 101 includes point-to-point communication components 101 com, and a wireline communication interface 105, in which the wireline communication interface 105 is communicatively connected by the single backhaul cable 103 to the core network 108. The wireline communication interface is also communicatively connected to the point-to-point communication components 101com, and by a bypass cable 104 to the second point-to-point communication system 102. The second point-to-point communication system 102 includes point-to-point communication components 102com, which are communicatively connected by the bypass cable 104 to the wireline communication interface 105 of the first point-to-point communication system 101.

Figure 2A:
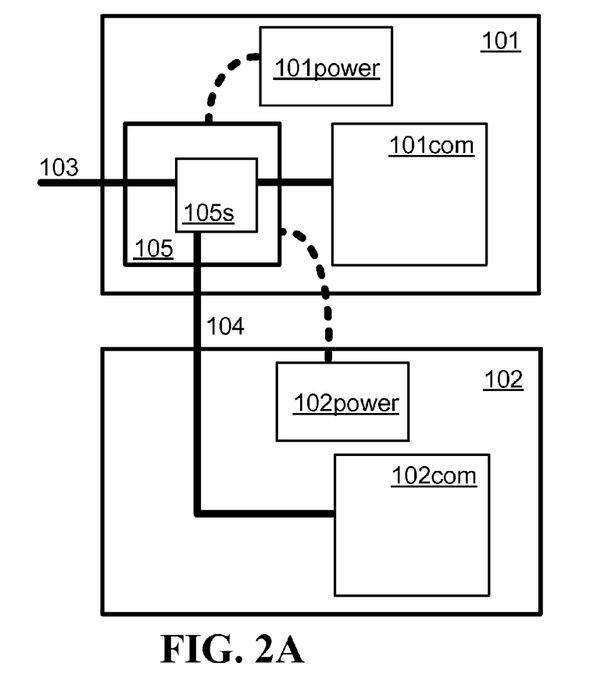
FIG. 2A illustrates one embodiment of a fail-safe communication system.

FIG. 2A illustrates one embodiment of a fail-safe communication system. In FIG. 2A, there is a first point-to-point communication system 101, which includes a wireline communication interface 105. The wireline communication interface 105 includes an Ethernet switch 105s, which is connected to a single backhaul cable 103, to point-to-point communication components 101com, and, via a bypass cable 104, to point-to-point communication components 102com which are included within a second point-to-point communication system 102. The wireline communication interface 105 is also connected to two power supplies, including a first power supplier 101 power included as part of the first point-to-point communication system 101, and a second power supplier 102 power included as part of a second point-to-point communication system 102.

Figure 2B:
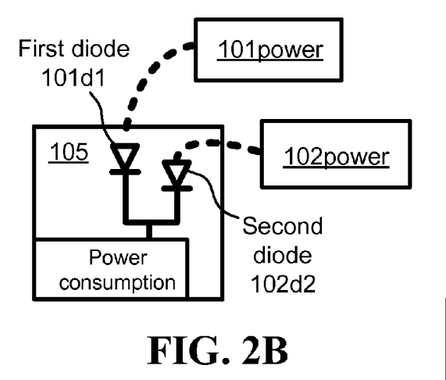
FIG. 2B illustrates one embodiment of a wireline communication interface with two power supplies.

FIG. 2B illustrates one embodiment of a wireline communication interface 105 with two power supplies. A first power supplier 101power is connected to the wireline communication interface 105 via a first diode 101d1, which insures that power can flow from 101power to the wireline communication interface 105, but not in the opposite direction. A second power supplier 102 power is connected to the wireline communication interface 105 via a second diode 102d2, which insures that power can flow from 102power to the wireline communication interface 105, but not in the opposite direction. Power is consumed by the wireline communication interface 105. FIG. 2B shows one embodiment for a combining of two sources of power. If one power source is turned off or shut down for any reason or reduced in voltage as a result of a malfunction, that power source will supply 0 power to the wireline communication interface 105, but the second power source may continue to supply power to the wireline communication interface 105.

Figure 2C:
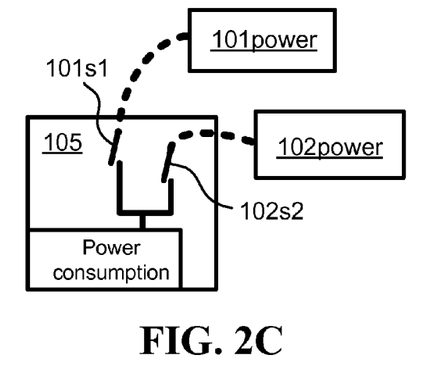
FIG. 2C illustrates one embodiment of a wireline communication interface with two power supplies.

FIG. 2C illustrates one embodiment of a wireline communication interface 105 with two power supplies. A first power supplier 101power is connected to the wireline communication interface 105 via a first power switch 101s1, which insures that power can flow from 101power to the wireline communication interface 105 only when the power switch 101s1 is positioned so as to complete the path to the wireline communication interface 105. A second power supplier 102power is connected to the wireline communication interface 105 via a second power switch 102s2, which insures that power can flow from 102power to the wireline communication interface 105 only when the power switch 102s2 is positioned so as to complete the path to the wireline communication interface 105. Power is consumed by the wireline communication interface 105. FIG. 2C shows one embodiment for a combining of two sources of power. If one power source is disconnected to the wireline communication interface 105 for any reason, that power source will supply 0 power to the wireline communication interface 105, but the second power source that is connected to the wireline communication interface 105 may continue to supply power to the wireline communication interface 105.

Figure 3A:
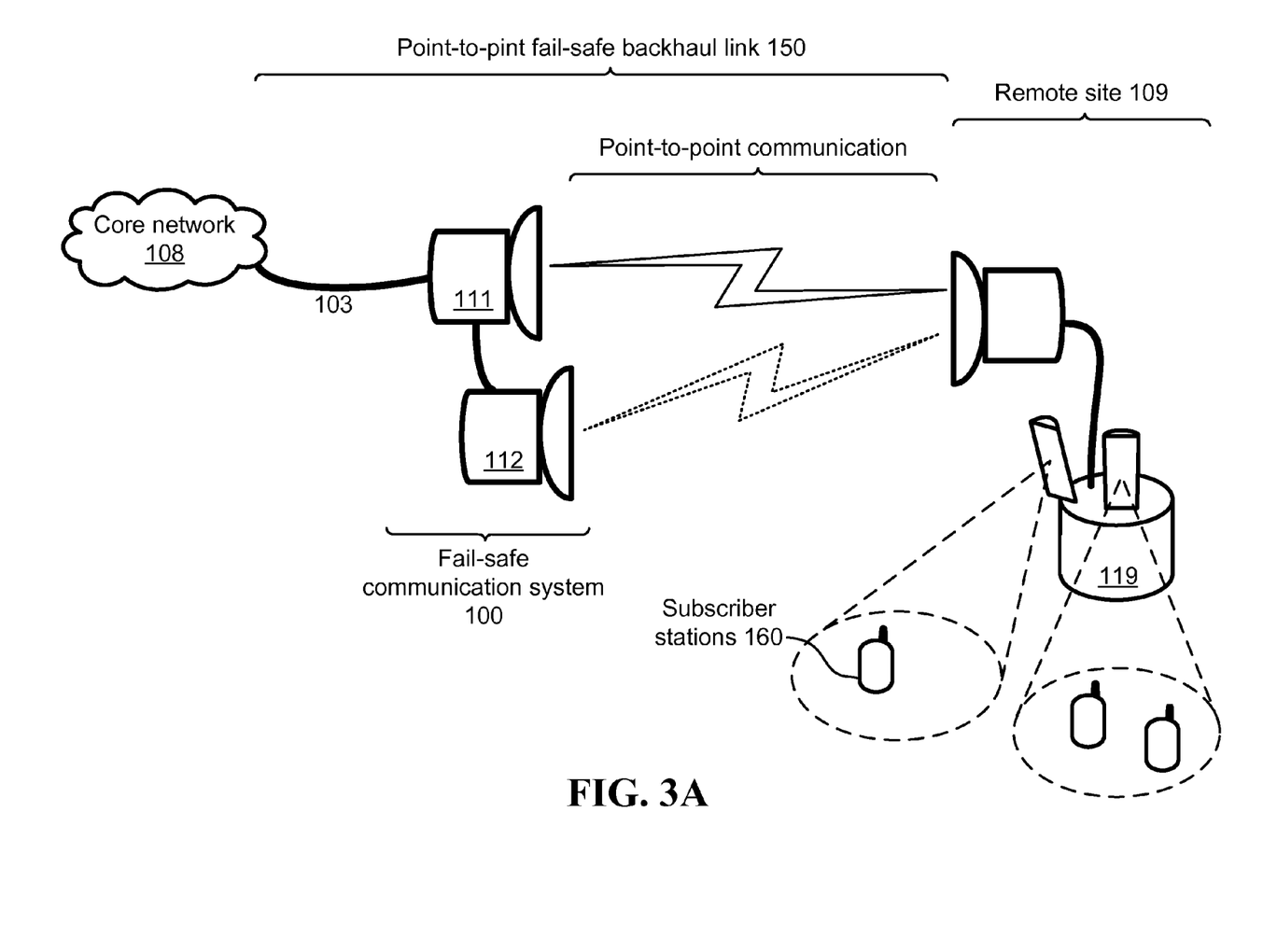
FIG. 3A illustrates one embodiment of a fail-safe communication system.

FIG. 3A illustrates one embodiment of a fail-safe communication system 100. The fail-safe communication system 100 includes a first wireless point-to-point communication system 111, and a second wireless point-to-point communication system 112. The first point-to-point communication system 111 is communicatively connected by a single backhaul cable 103 to a core network 108. The first point-to-point communication system 111 is also communicatively connected to the second point-to-point communication system 112. Both the first point-to-point communication system 111 and the second point-to-point communication system 112 are connected by point-to-point communication to a transceiver that is part of a remote site 109. The point-to-point fail-safe backhaul link 150 includes the single backhaul cable 103, the first wireless point-to-point communication system 111, the second point-to-point communication system 112, the link between the first wireless point-to-point communication 111 and the second wireless point-to-point communication system 112, and the point-to-point communication between the transceiver at the remote site 109 and both the first wireless point-to-point communication system 111 and the second wireless point-to-point communication system 112.

FIG. 3A also shows a remote site 109, which includes a transceiver in point-to-point communication with either the first wireless point-to-point communication system 111 or the second wireless point-to-point communication system 112, subscriber stations 160, and a wireless base station 119 that is communicatively connected to both the remote site transceiver and the wireless transceiver stations 160.

Figure 3B:
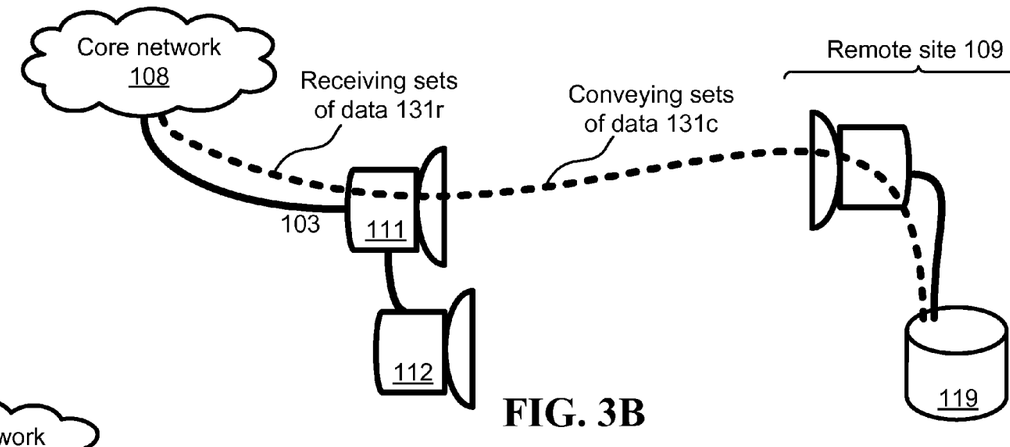
FIG. 3B illustrates one embodiment of a communication path in a fail-safe communication system.

FIG. 3B illustrates one embodiment of a communication path in a fail-safe communication system. This communication path may be called the "normal route" communication path. There is a core network 108 communicatively connected by a single backhaul cable 103 to a first wireless point-to-point communication system 111. The first wireless point-to-point communication system 111 is communicatively connected to a second wireless point-to-point communication system 112, and by point-to-point communication to a transceiver located at a remote site 109. The remote side includes the transceiver, and also a wireless base station 119 that is communicatively connected to the transceiver. In FIG. 3B, the communication path may operate in both directions, connecting the core network 108 via the single backhaul cable 103 to the first wireless point-to-point communication system 111, then via point-to-point communication to the transceiver at the remote site 109, and then reaching the wireless base station 119. When the communication operates from the core network 108 to the remote site 109 as shown in FIG. 3B, communication from the core network 108 via the single backhaul cable 103 to the first wireless point-to-point communication system 111 is receiving sets of data 131r at first wireless point-to-point communication system 111, and communication from the first wireless point-to-point communication system 111 to the transceiver of the remote site 109 is conveying sets of data 131*c*. As noted, although FIG. 3B illustrates communication from the core network 108 to the remote site 109, communication may also flow in the opposite direction, that is, from the remote site 109 to the core network 108.

Figure 3C:
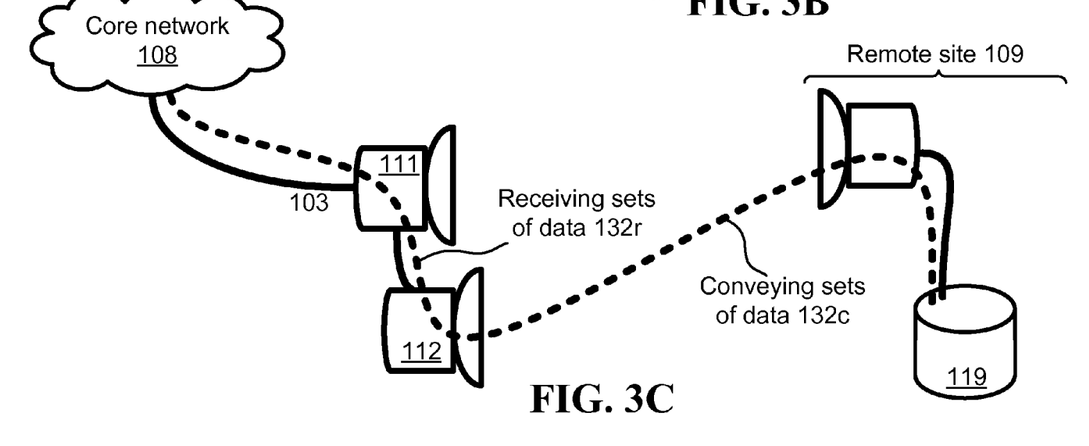
FIG. 3C illustrates one embodiment of a communication path in a fail-safe communication system.

FIG. 3C illustrates one embodiment of a communication path in a fail-safe communication system. This communication path may be called the "fault route" communication path. There is a core network 108 communicatively connected by a single backhaul cable 103 to a first wireless point-to-point communication system 111. The first wireless point-to-point communication system 111 is communicatively connected to a second wireless point-to-point communication system 112, and by point-to-point communication to a transceiver located at a remote site 109. The remote side includes the transceiver, and also a wireless base station 119 that is communicatively connected to the transceiver. In FIG. 3C, the communication path operates in both directions, connecting the core network 108 via the single backhaul cable 103 to the first wireless point-to-point communication system 111, then to the second wireless point-to-point communication system 112, then via point-to-point communication to the transceiver at the remote site 109, and then with the wireless base station 119. When the communication operates from the core network 108 to the remote site 109 as shown in FIG. 3B, communication from the core network 108 via the single backhaul cable 103 to the first wireless point-to-point communication system 111 to the second wireless point-to-point communication system 112 is receiving sets of data 132*r* at second wireless point-to-point communication system 112, and communication from the second wireless point-to-point communication system 112 to the transceiver of the remote site 109 is conveying sets of data 132*c*. As noted, although FIG. 3C illustrates communication from the core network 108 to the remote site 109, communication may also flow in the opposite direction, that is, from the remote site 109 to the core network 108.

Figure 4:
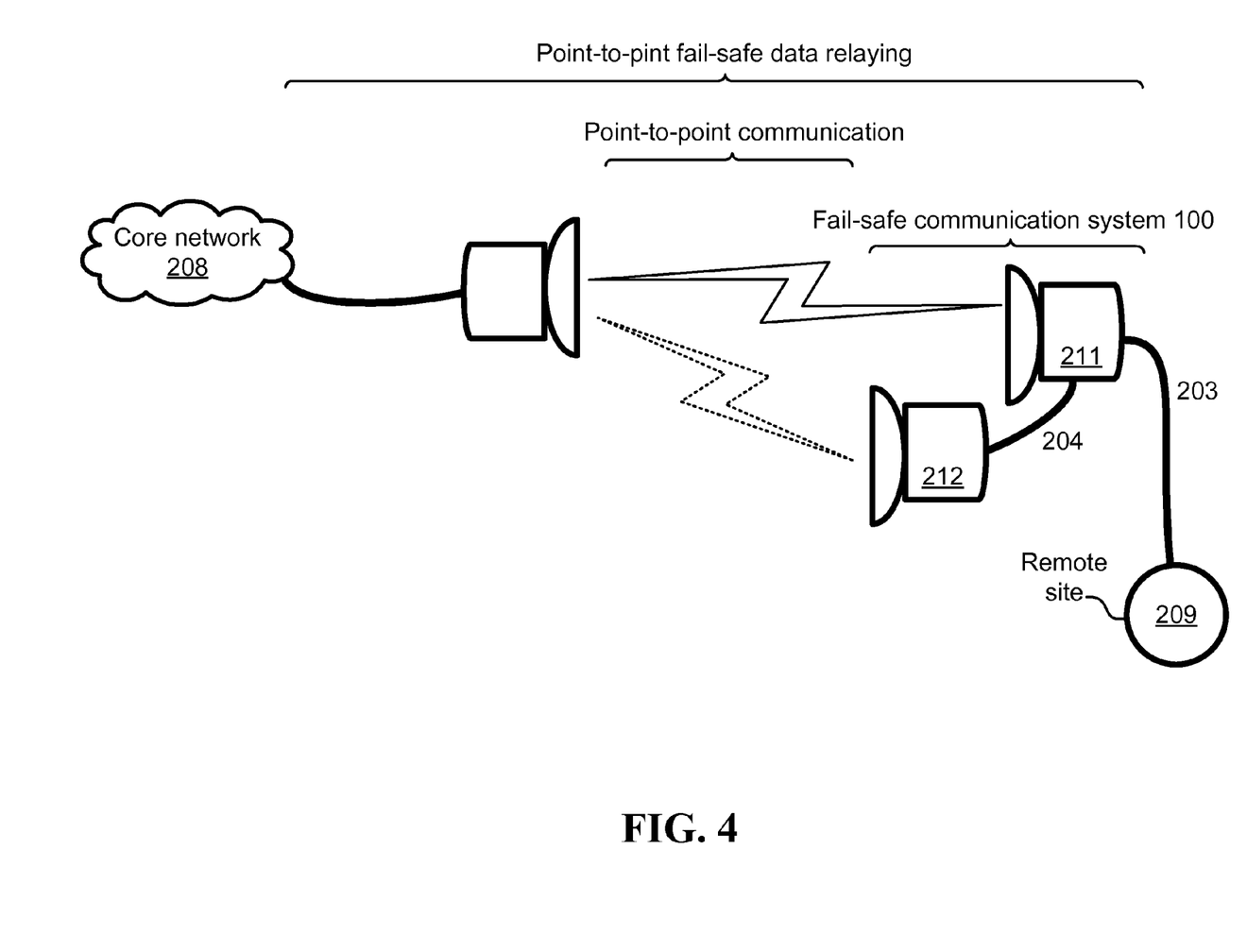
FIG. 4 illustrates one embodiment of a fail-safe communication system.

FIG. 4 illustrates one embodiment of a fail-safe communication system 100. In this embodiment, there is a core network 208 that is communicatively connected to a transceiver, which is connected by point-to-point communication with either or both of a first point-to-point communication system 211 and a second point-to-point communication system 212. The first point-to-point communication system 211 and the second point-to-point communication system 212 are connected by a bypass cable 204. Also in this embodiment, the first point-to-point communication system 211 is connected by a single feed cable 203 to a remote site 209.

In one embodiment, there is a fail-safe communication system 100 which is operative to communicatively connect a core network 108 with a remote site 109. The fail-safe communication system 100 includes a first point-to-point communication system 101, a second point-to-point communication system 102, and a single backhaul cable 103 that directly connects the first point-to-point communication system 101 with the core network 108. The first point-to-point communication system 101 includes a wireline communication interface 105 which is operative to: (i) communicatively connect the backhaul cable 103 with point-to-point communication components 101com of the first point-to-point communication system 101, and (ii) communicatively connect the backhaul cable 103, using a bypass cable 104, with point-to-point communication components 102com of the second point-to-point communication system 102, in an event of malfunction associated with the first point-to-point communication system 101, such that the second point-to-point communication system 102 performs point-to-point and backhaul communication instead of the first point-to-point communication system 101.

In a first alternative embodiment of the system just described for a fail-safe communication system 100, the wireline communication interface 105 is configured to receive electrical power from a first power supplier 101power located in the first point-to-point communication system 101 and from a second power supplier 102power located in the second point-to-point communication system 102, such that the second power supplier 102power is used to power the wireline communication interface 105 in a case that the event of malfunction affects the first power supplier 101power.

In a first possible configuration of the first alternative embodiment just described, the first power supplier 101power is connected to the wireline communication interface 105 via a first diode 101*d*1, and the second power supplier 102power is connected to the wireline communication interface 105 via a second diode 102*d*2, such that the event of malfunction affecting the first power supplier 101power does not interfere with the second power supplier 102power.

In a second possible configuration of the first alternative embodiment just described, the first power supplier 101power is connected to the wireline communication interface 105 via a first power switch 101*s*1, and the second power supplier 102power is connected to the wireline communication interface 105 via a second power switch 102*s*2, such that the first power supplier 101power is switched off as a result of said event of malfunction, and the second power supplier 102power is switched on as a result of said event of malfunction.

In a second alternative embodiment of the system just described for a fail-safe communication system 100, the first point-to-point communication system 101 is a first wireless point-to-point communication system 111.

In a third alternative embodiment of the system just described for a fail-safe communication system 100, the second point-to-point communication system 102 is a second wireless point-to-point communication system 112.

In a fourth alternative embodiment of the system just described for a fail-safe communication system 100, the first point-to-point communication system 101 is a first wireless point-to-point communication system 111, and the second point-to-point communication system 102 is a second wireless point-to-point communication system 112.

In a first possible configuration of the fourth alternative embodiment just described, the first wireless point-to-point communication system 111 is further configured to: (i) receive sets of data 131*r* from the core network 108 via the single backhaul cable 103, and (ii) convey wirelessly the sets of data 131*c* to a remote site 109, in an event that the first wireless point-to-point communication system 111 is capable of such receiving and conveying. Also in a first possible configuration of the fourth alternative embodiment just described the second wireless point-to-point communication system 112 is further configured to: (i) receive the sets of data 132*r* from the core network 108 via the single backhaul cable 103 and via the bypass cable after or during the event of malfunction, and (ii) convey wirelessly the sets of data 132*c* to the remote site 109, instead of the first wireless point-to-point communication system 111, after of during said the of malfunction, thereby maintaining continuity of data flow from the core network 108 to the remote site 109 after or during the event of malfunction.

In one possible variation of the first possible configuration of the fourth alternative embodiment just described, the remote site includes a wireless base station 119.

In one further implementation of the possible variation of the first possible configuration of the fourth alternative embodiment just described, the first wireless point-to-point communication system 111 and the second wireless point-to-point communication system 112 together with the single backhaul cable 103 and the bypass cable are configured to serve as a point-to-point fail-safe backhaul link 150 between the core network 108 and the wireless base station 119, thereby allowing the wireless base station 119 to continue uninterrupted wireless access services to associated subscriber stations 160 after or during the event of malfunction.

In a fifth alternative embodiment of the system just described for a fail-safe communication system 100, the wireline communication interface 105 is further configured to detect the event of malfunction.

In a first possible configuration of the fifth alternative embodiment just described, after the wireline communication interface 105 detects the event of malfunction, the wireline communication interface 105 is further configured to disconnect point-to-point communication components 101com of the first point-to-point communication system 101 from the single backhaul cable 103, and the wireless communication interface 105 is further configured to connect the point-to-point communication components 102com of the second point-to-point communication system 102 with the single backhaul cable 103 via the bypass cable 104. In a second possible configuration of the fifth alternative embodiment just described, after the wireline communication interface 105 detects the event of malfunction, the wireline communication interface 105 is further configured to switch off the point-to-point communication components 101com of the first point-to-point communication system 101, and the wireline communication interface 105 is further configured to switch on the point-to-point communication components 102com of the second point-to-point communication system 102.

In a sixth alternative embodiment of the system just described for a fail-safe communication system 100, the single backhaul cable 103 is a cable operative to transport Ethernet data between the core network 108 and the first point-to-point communication system 101 or the second point-to-point communication system 102.

In a first possible configuration of the sixth alternative embodiment just described, the single backhaul cable 103 carries electrical signals over metal conductors.

In a second possible configuration of the sixth alternative embodiment just described, the single backhaul cable 103 is an optical fiber cable.

In a third possible configuration of the sixth alternative embodiment just described, the wireline communication interface 105 includes an Ethernet switch 105s which is operative (i) to communicatively connect the single backhaul cable 103 with the point-to-point communication components 101com of the first point-to-point communication system 101, and (ii) to communicatively connect the single backhaul cable 103, using the bypass cable 104, with the point-to-point communication components 102com of the second point-to-point communication system 102, after or during the event of malfunction.

One embodiment is a method for fail-safe communication. A first point-to-point communication system 101 relays sets of data from a core network 108 via a single backhaul cable 103 to a wireline communication interface 105 which is part of the first point-to-point communication system 101. These sets of data are relayed from the wireline communication interface 105 to point-to-point communication components 101com of the first point-to-point communication system 101. These sets of data are relayed from the point-to-point communication components 101com of the first point-to-point communication system 101 to a remote site 109. Also in this embodiment, the wireline communication interface 105 detects either a failure in the point-to-point components 101com of the first point-to-point communication system 101 or a failure in a first power supplier 101power located in the first point-to-point communication system 101. This detected failure, whether in components 101com or power supplier 101power, prevents the first point-to-point communication system 101 from relaying the sets of data between the core network 108 and the remote site 109. Also in this embodiment, the wireline communication interface 105 bypasses the point-to-point communication components 101com of the first point-to-point communication system 101, by routing the sets of data from the wireline communication interface 105 to point-to-point components 102com of a second point-to-point communication system 102 via a bypass cable 104. In this manner, according to this embodiment, delivery of the sets of data is made to the remote site 109 from the second point-to-point communication system 102.

In a first alternative embodiment of the method just described for fail-safe communication, the method further includes protecting the wireline communication interface 105 from the failure, in the components 101com or in the power supplier 101power, by feeding the wireline communication interface 105 from a second power supplier 102power located in the second point-to-point communication system 102.

In a first possible configuration of the first alternative embodiment of the method just described for fail-safe communication, the method further includes protecting the wireline communication interface 105 from the failure in the components 101com or in the power supplier 101power, by combining power supply to the wireline communication interface 105 from the first power supplier 101power and second power supplier 102power using two diodes 101d1 and 101d2.

In a second possible configuration of the first alternative embodiment of the method just described for fail-safe communication, the method further includes protecting the wireline communication interface 105 from the failure in the components 101com or in the power supplier 101power, by disconnecting the wireline communication interface 105 from the first power supplier 101power.

In a second alternative embodiment of the method just described for fail-safe communication, the method further includes protecting the wireline communication interface 105 from the failure in the components 101com or in the power supplier 101power, by disconnecting the wireline communication interface 105 from the point-to-point communication components 101com of the first communication system 101.

In a third alternative embodiment of the method just described for fail-safe communication, the detection of the failure of the components 101com or the power supplier 101power is done by the wireline communication interface 105 sensing a drop in voltage provided by the first power supplier 101power.

In a fourth alternative embodiment of the method just described for fail-safe communication, the detection of the failure of the components 101com or the power supplier 101power is done by the wireline communication interface 105 sensing an accumulation of the sets of data inside data buffers of the wireline communication interface 105.

In one embodiment, there is a fail-safe communication system 100 which is operative to communicatively connect a core network 208 with a remote site 209. The fail-safe communication system 100 includes a first point-to-point communication system 211, a second point-to-point communication system 212, and a single feed cable 203 that directly connects the first point-to-point communication system 211 with the remote site 209. The first point-to-point communication system 211 includes a wireline communication interface which is operative to: (i) communicatively connect the single feed cable 203 with point-to-point communication components of the first point-to-point communication system 211, and (ii) communicatively connect the single feed cable 203, using a bypass cable 204, with point-to-point communication components of the second point-to-point communication system 212, in an event of malfunction associated with the first point-to-point communication system 211, such that the second point-to-point communication system 212 performs point-to-point and backhaul communication instead of the first point-to-point communication system 211.

Figure 5:
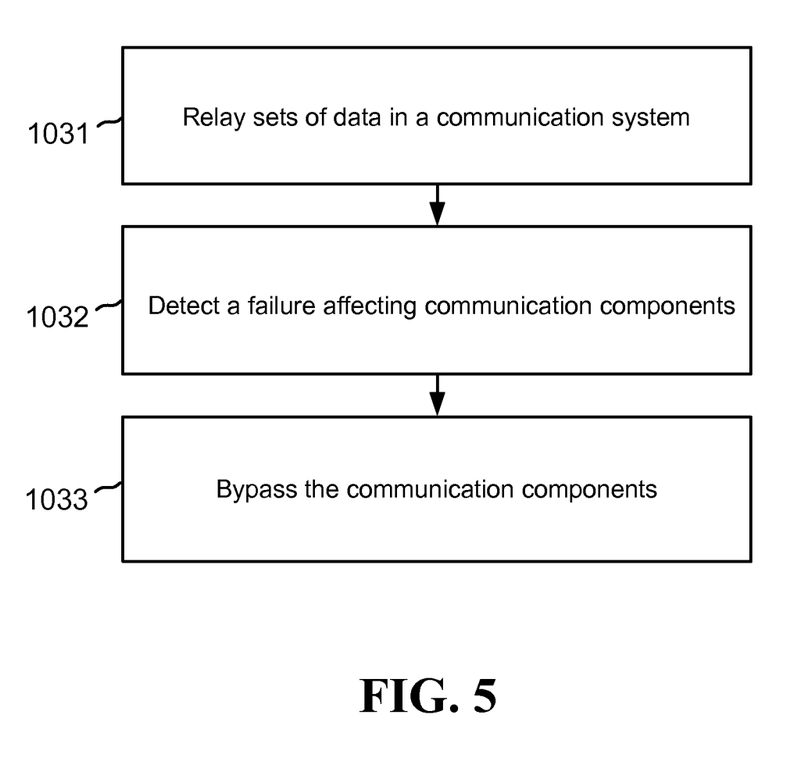
FIG. 5 illustrates a flow diagram describing one method for fail-safe communication, including relaying sets of data, detecting a failure in communication components, and bypassing the failed communication components by routing sets of data to different communication components.

FIG. 5 illustrates one embodiment of a method for fail-safe communication. In step 1031, a first point-to-point communication system 101 relays sets of data (i) from a core network 108, via a single backhaul cable 103, to a wireline communication interface 105 belonging to the first point-to-point communication system 101, (ii) from the wireline communication interface 105 to point-to-point components 101com of the first point-to-point communication system 101, and (iii) from the point-to-point components 101com of the first point-to-point communication system 101 to a remote site 109. In step 1032, the wireline communication interface 105 detects a failure in the point-to-point components 101com of the first point-to-point communication system 101 or a failure in the first power supplier 101power located in the first point-to-point communication system 101, and said failure, whether in components 101com or first power supplier 101power, prevents the first point-to-point communication system 101 from relaying the sets of data between the core network 108 and the remote site 109. In step 1033, the wireline communication interface 105 bypasses the point-to-point communication components 101com of the first point-to-point communication system 101, by routing the sets of data from the wireline communication interface 105 to point-to-point components 102com of a second point-to-point communication system 102 via a bypass cable 104, thereby allowing delivery of the sets of data to the remote site 109 via the second point-to-point communication system 102.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A fail-safe communication system operative to communicatively connect a core network with a remote site, and having a single backhaul cable, comprising:
   a first wireless point-to-point communication system;
   a second wireless point-to-point communication system; and
   a backhaul cable directly connecting said first wireless point-to-point communication system with a core network,
   wherein the first wireless point-to-point communication system comprises a wireline communication interface operative to:
   communicatively connect said backhaul cable with point-to-point communication components of said first wireless point-to-point communication system, thereby allowing the first wireless point-to-point communication system to: (i) receive sets of data from the core network via the backhaul cable, and (ii) convey wirelessly said sets of data to a remote site, in an event that said first wireless point-to-point communication system is capable of such receiving and conveying; and communicatively connect said backhaul cable, using a bypass cable, with point-to-point communication components of said second wireless point-to-point communication system, in an event of malfunction associated with the first point-to-point communication system, thereby allowing the second wireless point-to-point communication system to: (i) receive said sets of data from the core network via the backhaul cable and via the bypass cable after or during an event of malfunction associated with the first wireless point-to-point communication system, and (ii) convey wirelessly said sets of data to said remote site, instead of the first wireless point-to-point communication system, after of during said event of malfunction, thereby maintaining continuity of data flow from said core network to said remote site after or during said event of malfunction.

2. The system of claim 1, wherein said wireline communication interface is configured to receive electrical power from a first power supplier located in the first wireless point-to-point communication system and from a second power supplier located in the second wireless point-to-point communication system, such that said second power supplier is used to power said wireline communication interface in a case that said event of malfunction affects the first power supplier.

3. The system of claim 2, wherein said first power supplier is connected to said wireline communication interface via a first diode, and said second power supplier is connected to said wireline communication interface via a second diode, such that the event of malfunction affecting the first power supplier does not interfere with the second power supplier.

4. The system of claim 2, wherein said first power supplier is connected to said wireline communication interface via a first power switch, and said second power supplier is connected to said wireline communication interface via a second power switch, such that the first power supplier is switched off as a result of said event of malfunction, and the second power supplier is switched on as a result of said event of malfunction.

5. The system of claim 1, wherein said remote site comprises a wireless base station.

6. The system of claim 5, wherein the first and second wireless point-to-point communication systems together with the backhaul cable and the bypass cable are configured to serve as a point-to-point fail-safe backhaul link between the core network and the wireless base station, thereby allowing the wireless base station to continue uninterrupted wireless access services to associated subscriber stations after or during said event of malfunction.

7. The system of claim 1, wherein the wireline communication interface is further configured to detect said event of malfunction.

8. The system of claim 7, wherein after said detection, the wireline communication interface is further configured to:
disconnect said point-to-point communication components of said first wireless point-to-point communication system from said backhaul cable; and
connect said point-to-point communication components of said second wireless point-to-point communication system with said backhaul cable via the bypass cable.

9. The system of claim 7, wherein after said detection, wireline communication interface is further configured to:
switch off said point-to-point communication components of said first wireless point-to-point communication system; and
switch on said point-to-point communication components of said second wireless point-to-point communication system.

10. The system of claim 1, wherein the backhaul cable is a cable operative to transport Ethernet data between the core network and the first or second wireless point-to-point communication systems.

11. The system of claim 10, wherein the backhaul cable carries electrical signals over metal conductors.

12. The system of claim 10, wherein the backhaul cable is an optical fiber cable.

13. The system of claim 10, wherein the wireline communication interface comprises an Ethernet switch operative to (i) communicatively connect said backhaul cable with point-to-point communication components of said first wireless point-to-point communication system, and (ii) communicatively connect said backhaul cable, using the bypass cable, with point-to-point communication components of said second wireless point-to-point communication system, after or during said event of malfunction.

14. A method for fail-safe communication, comprising:
relaying sets of data by a first point-to-point communication system: (i) from a core network to a wireline communication interface belonging to said first point-to-point communication system via a backhaul cable, (ii) from said wireline communication interface to point-to-point communication components of said first point-to-point communication system, and (iii) from said point-to-point communication components of said first point-to-point communication system to a remote site;
detecting, by said wireline communication interface, a failure in the point-to-point communication components of said first point-to-point communication system or in a first power supplier located in said first point-to-point communication system, said failure preventing said first point-to-point communication system from relaying said sets of data between the core network and the remote site; and
bypassing, by said wireline communication interface, the point-to-point communication components of said first point-to-point communication system, by routing the sets of dada from said wireline communication interface to point-to-point communication components of a second point-to-point communications system via a bypass cable, thereby allowing delivery of said sets of data to said remote site via the second point-to-point communication system.

15. The method of claim 14, further comprising: protecting said wireline communication interface from said failure, by feeding said wireline communication interface from a second power supplier located in said second point-to-point communication system.

16. The method of claim 15, further comprising: protecting said wireline communication interface from said failure, by combining power supply to the communication interface from the first and second power suppliers using two diodes.

17. The method of claim 15, further comprising: protecting said wireline communication interface from said failure, by disconnecting the communication interface from the first power supplier.

18. The method of claim 14, further comprising: protecting said wireline communication interface from said failure, by disconnecting said wireline communication interface from said point-to-point communication components of said first communication system.

19. The method of claim 14, wherein said detection is done by sensing a drop in voltage provided by the first power supplier.

20. The method of claim 14, wherein said detection is done by sensing an accumulation of said sets of data inside data buffers of said wireline communication interface.

21. A fail-safe communication system operative to communicatively connect a remote site with a core network, and having a single feed cable, comprising:

a first wireless point-to-point communication system;

a second wireless point-to-point communication system; and a feed cable directly connecting said first point-to-point communication system with a remote site,  wherein the first wireless point-to-point communication system comprises a wireline communication interface operative to:

communicatively connect said feed cable with point-to-point communication components of said first wireless point-to-point communication system, thereby allowing the first wireless point-to-point communication system to: (i) receive sets of data from the remote site via the feed cable and (ii) convey wirelessly said sets of data to a core network, in an event that said first wireless point-to-point communication system is capable of such receiving and conveying; and  communicatively connect said feed cable, using a bypass cable, with point-to-point communication component of said second wireless point-to-point communication system, in an event of malfunction associated with the first wireless point-to-point communication system, thereby allowing the second wireless point-to-point communication system to: (i) receive said sets of data from the remote site via the feed cable and via the bypass cable after or during an event of malfunction associated with the first wireless point-to-point communication system, and (ii) convey wirelessly said sets of data to said core network, instead of the first wireless point-to-point communication system, after of during said event of malfunction, thereby maintaining continuity of data flow from said remote site to said core network after or during said event of malfunction.

\* \* \* \* \*